United States Patent
Sapek et al.

(10) Patent No.: US 11,962,576 B2
(45) Date of Patent: Apr. 16, 2024

(54) ENCLAVE INTERACTIONS

(71) Applicant: Google LLC, Mountain View, CA (US)

(72) Inventors: Anna Sapek, Kirkland, WA (US); Uday Savagaonkar, Redmond, WA (US); Jeffrey Thomas Andersen, Kirkland, WA (US); Thomas Michael Roeder, Kirkland, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/973,664

(22) Filed: Oct. 26, 2022

(65) Prior Publication Data
US 2023/0039096 A1 Feb. 9, 2023

Related U.S. Application Data

(63) Continuation of application No. 17/046,547, filed as application No. PCT/US2018/042684 on Jul. 18, 2018, now Pat. No. 11,509,643.
(Continued)

(51) Int. Cl.
*H04L 9/40* (2022.01)
*G06Q 30/018* (2023.01)
*H04L 9/08* (2006.01)

(52) U.S. Cl.
CPC ............ *H04L 63/08* (2013.01); *H04L 9/0844* (2013.01); *H04L 63/0428* (2013.01); *H04L 63/101* (2013.01); *G06Q 30/0185* (2013.01)

(58) Field of Classification Search
CPC ... H04L 63/08; H04L 9/0844; H04L 63/0428; H04L 63/101; H04L 9/0897;
(Continued)

(56) References Cited

U.S. PATENT DOCUMENTS 5,970,250 A 10/1999 England et al.
6,085,217 A 7/2000 Ault et al.
(Continued)

FOREIGN PATENT DOCUMENTS

CN 1685297 A 10/2005
CN 101589361 A 11/2009
(Continued)

OTHER PUBLICATIONS

Extended European Search Report for European Patent Application No. 22207041.9 dated Feb. 10, 2023. 8 pages.
(Continued)

*Primary Examiner* — Aravind K Moorthy
(74) *Attorney, Agent, or Firm* — Lerner David LLP

(57) ABSTRACT

Aspects of the disclosure provide various methods relating to enclaves. For instance, a method of authentication for an enclave entity with a second entity may include receiving, by one or more processors of a host computing device of the enclave entity, a request and an assertion of identity for the second entity, the assertion including identity information for the second identity; using an assertion verifier of the enclave entity to determine whether the assertion is valid; when the assertion is valid, extracting the identity information; authenticating the second entity using an access control list for the enclave entity to determine whether the identity information meets expectations of the access control list; when the identity information meets the expectations of the access control list, completing the request.

20 Claims, 8 Drawing Sheets

Related U.S. Application Data

(60) Provisional application No. 62/664,463, filed on Apr. 30, 2018.

(58) Field of Classification Search
CPC .............. H04L 63/061; H04L 63/0823; H04L 2209/127; G06Q 30/0185; G06Q 20/3227; G06Q 20/4014; G06Q 20/405; G06F 21/606; G06F 21/74; G06F 21/53; H04W 12/0471
See application file for complete search history.

(56) References Cited

U.S. PATENT DOCUMENTS

| | | |
|---|---|---|
| 6,779,112 B1 | 8/2004 | Guthery |
| 6,938,159 B1 | 8/2005 | O'Connor et al. |
| 7,624,433 B1 * | 11/2009 | Clark ..................... H04L 63/08 726/9 |
| 7,661,131 B1 * | 2/2010 | Shaw .................... H04L 63/029 709/227 |
| 7,788,711 B1 * | 8/2010 | Sun ..................... H04L 63/0815 709/227 |
| 7,860,983 B1 * | 12/2010 | Mansfield .............. G06Q 10/10 709/200 |
| 7,904,940 B1 | 3/2011 | Hernacki et al. |
| 8,145,909 B1 | 3/2012 | Agrawal et al. |
| 8,155,036 B1 | 4/2012 | Brenner et al. |
| 8,220,035 B1 * | 7/2012 | Pravetz ................. H04L 67/02 715/749 |
| 8,245,285 B1 * | 8/2012 | Ravishankar ........... G06F 21/77 726/9 |
| 8,353,016 B1 | 1/2013 | Pravetz et al. |
| 8,442,527 B1 * | 5/2013 | Machiraju .............. H04W 12/069 713/184 |
| 8,631,486 B1 | 1/2014 | Friedman et al. |
| 9,246,690 B1 | 1/2016 | Roth et al. |
| 9,251,047 B1 | 2/2016 | McKelvie et al. |
| 9,374,370 B1 * | 6/2016 | Bent, II .............. H04W 12/068 |
| 9,444,627 B2 | 9/2016 | Varadarajan et al. |
| 9,444,948 B1 | 9/2016 | Ren et al. |
| 9,460,077 B1 * | 10/2016 | Casey ................. G06F 16/2365 |
| 9,531,727 B1 | 12/2016 | Himberger et al. |
| 9,584,517 B1 * | 2/2017 | Roth ..................... G06F 21/602 |
| 9,615,253 B1 | 4/2017 | Osborn |
| 9,710,748 B2 | 7/2017 | Ross et al. |
| 9,735,962 B1 | 8/2017 | Yang et al. |
| 9,754,116 B1 | 9/2017 | Roth et al. |
| 9,779,352 B1 | 10/2017 | Hyde et al. |
| 9,940,456 B2 | 4/2018 | Nesher et al. |
| 10,007,464 B1 | 6/2018 | Blinzer |
| 10,021,088 B2 * | 7/2018 | Innes ..................... H04L 9/3263 |
| 10,375,177 B1 | 8/2019 | Bretan |
| 10,382,202 B1 | 8/2019 | Ohsie et al. |
| 10,530,777 B2 | 1/2020 | Costa |
| 10,685,131 B1 | 6/2020 | Lunsford et al. |
| 10,826,711 B2 * | 11/2020 | Barry ..................... H04L 9/0825 |
| 11,210,412 B1 | 12/2021 | Ghetti et al. |
| 2003/0005118 A1 | 1/2003 | Williams |
| 2003/0074584 A1 * | 4/2003 | Ellis ..................... H04L 63/0428 726/22 |
| 2003/0200431 A1 * | 10/2003 | Stirbu ................... H04L 63/0869 713/168 |
| 2003/0202523 A1 * | 10/2003 | Buswell .................. H04L 12/66 370/352 |
| 2003/0236975 A1 * | 12/2003 | Birk ..................... H04L 63/0823 726/9 |
| 2004/0030764 A1 | 2/2004 | Birk et al. |
| 2004/0093522 A1 * | 5/2004 | Bruestle ................. H04W 12/50 726/16 |
| 2005/0050316 A1 * | 3/2005 | Peles ................... H04L 63/0428 713/151 |
| 2005/0144437 A1 | 6/2005 | Ransom et al. |
| 2005/0166191 A1 | 7/2005 | Kandanchatha et al. |
| 2005/0198622 A1 * | 9/2005 | Ahluwalia ............ G06F 11/3672 717/130 |
| 2005/0204345 A1 * | 9/2005 | Rivera ................. G06F 11/3624 717/127 |
| 2006/0021004 A1 | 1/2006 | Moran et al. |
| 2006/0021010 A1 | 1/2006 | Atkins et al. |
| 2006/0095969 A1 * | 5/2006 | Portolani ............... H04L 63/0464 726/23 |
| 2006/0130131 A1 * | 6/2006 | Pai ..................... H04L 63/0823 726/9 |
| 2006/0174037 A1 | 8/2006 | Bernardi et al. |
| 2006/0225055 A1 | 10/2006 | Tieu |
| 2006/0274695 A1 * | 12/2006 | Krishnamurthi ...... H04L 9/3213 713/155 |
| 2008/0005573 A1 * | 1/2008 | Morris .................. H04L 9/3257 713/180 |
| 2008/0005798 A1 * | 1/2008 | Ross ..................... H04L 63/08 726/26 |
| 2008/0091948 A1 | 4/2008 | Hofmann et al. |
| 2008/0244257 A1 | 10/2008 | Vaid et al. |
| 2009/0077655 A1 | 3/2009 | Sermersheim et al. |
| 2009/0228951 A1 * | 9/2009 | Ramesh ................ H04L 69/321 726/1 |
| 2010/0150352 A1 | 6/2010 | Mansour et al. |
| 2010/0313246 A1 * | 12/2010 | Irvine ................... H04L 63/102 726/4 |
| 2011/0075652 A1 * | 3/2011 | Ogura ................. H04L 65/4053 370/351 |
| 2011/0113244 A1 * | 5/2011 | Chou .................. H04W 52/281 713/168 |
| 2011/0225559 A1 | 9/2011 | Nishide |
| 2012/0151568 A1 | 6/2012 | Pieczul et al. |
| 2012/0159184 A1 | 6/2012 | Johnson et al. |
| 2012/0272217 A1 * | 10/2012 | Bates ................... G06F 11/362 717/124 |
| 2012/0275601 A1 * | 11/2012 | Matsuo ................. H04L 9/0844 380/282 |
| 2013/0111549 A1 * | 5/2013 | Sowatskey .......... H04L 63/0823 726/3 |
| 2013/0125197 A1 | 5/2013 | Pravetz et al. |
| 2013/0159726 A1 | 6/2013 | McKeen et al. |
| 2013/0166907 A1 * | 6/2013 | Brown ................. H04L 9/3268 713/156 |
| 2013/0239171 A1 * | 9/2013 | Ramesh .............. H04L 63/0218 726/1 |
| 2013/0247164 A1 | 9/2013 | Hoggan |
| 2013/0312074 A1 * | 11/2013 | Sarawat ................ H04W 12/06 726/7 |
| 2013/0312117 A1 * | 11/2013 | Sapp, II ................ G06F 21/62 726/30 |
| 2014/0047532 A1 | 2/2014 | Sowatskey |
| 2014/0086406 A1 * | 3/2014 | Polzin .................. H04L 9/0897 380/44 |
| 2014/0089617 A1 * | 3/2014 | Polzin .................. G06F 12/1441 711/E12.091 |
| 2014/0089712 A1 * | 3/2014 | Machnicki .............. G06F 21/74 713/320 |
| 2014/0157410 A1 * | 6/2014 | Dewan ................... G06F 21/53 726/23 |
| 2014/0189246 A1 | 7/2014 | Xing et al. |
| 2014/0189326 A1 | 7/2014 | Leslie et al. |
| 2014/0267332 A1 | 9/2014 | Chhabra et al. |
| 2014/0281544 A1 | 9/2014 | Paczkowski et al. |
| 2014/0281560 A1 | 9/2014 | Ignatchenko et al. |
| 2014/0297962 A1 | 10/2014 | Rozas et al. |
| 2014/0337983 A1 * | 11/2014 | Kang ..................... G06F 21/78 726/26 |
| 2015/0007291 A1 | 1/2015 | Miller |
| 2015/0033012 A1 * | 1/2015 | Scarlata ................ H04L 9/3242 713/161 |
| 2015/0089173 A1 | 3/2015 | Chhabra et al. |
| 2015/0131919 A1 | 5/2015 | Dewangan et al. |
| 2015/0178226 A1 | 6/2015 | Scarlata et al. |
| 2015/0200949 A1 | 7/2015 | Willhite et al. |
| 2015/0249645 A1 | 9/2015 | Sobel et al. |
| 2015/0281279 A1 * | 10/2015 | Smith .................... H04L 63/08 726/1 |

(56) References Cited

U.S. PATENT DOCUMENTS

| | | | |
|---|---|---|---|
| 2016/0036786 A1 | 2/2016 | Gandhi | |
| 2016/0080379 A1* | 3/2016 | Saboori | H04W 12/0431 |
| | | | 726/5 |
| 2016/0110540 A1 | 4/2016 | Narendra Trivedi et al. | |
| 2016/0134599 A1 | 5/2016 | Ross et al. | |
| 2016/0147979 A1 | 5/2016 | Kato | |
| 2016/0171248 A1 | 6/2016 | Nesher et al. | |
| 2016/0173287 A1* | 6/2016 | Bowen | H04L 9/3268 |
| | | | 713/156 |
| 2016/0179702 A1 | 6/2016 | Chhabra et al. | |
| 2016/0188350 A1* | 6/2016 | Shah | G09C 1/00 |
| | | | 717/148 |
| 2016/0188873 A1* | 6/2016 | Smith | G06F 21/53 |
| | | | 726/22 |
| 2016/0188889 A1* | 6/2016 | Narendra Trivedi | |
| | | | G06F 21/606 |
| | | | 713/189 |
| 2016/0219044 A1 | 7/2016 | Karunakaran et al. | |
| 2016/0219060 A1 | 7/2016 | Karunakaran et al. | |
| 2016/0226913 A1 | 8/2016 | Sood et al. | |
| 2016/0283411 A1* | 9/2016 | Sheller | G06F 21/57 |
| 2016/0285858 A1* | 9/2016 | Li | H04L 63/10 |
| 2016/0316025 A1* | 10/2016 | Lloyd | H04L 65/1069 |
| 2016/0330301 A1 | 11/2016 | Raindel et al. | |
| 2016/0350534 A1* | 12/2016 | Poornachandran | H04L 9/3273 |
| 2016/0359965 A1* | 12/2016 | Murphy | H04L 67/1044 |
| 2016/0366123 A1* | 12/2016 | Smith | H04W 12/122 |
| 2016/0371540 A1 | 12/2016 | Pabbichetty | |
| 2016/0380985 A1* | 12/2016 | Chhabra | H04L 63/061 |
| | | | 713/171 |
| 2017/0093572 A1 | 3/2017 | Hunt et al. | |
| 2017/0104597 A1* | 4/2017 | Negi | H04L 9/0825 |
| 2017/0126660 A1 | 5/2017 | Brannon | |
| 2017/0126661 A1 | 5/2017 | Brannon | |
| 2017/0185766 A1 | 6/2017 | Narendra Trivedi et al. | |
| 2017/0201380 A1 | 7/2017 | Schaap et al. | |
| 2017/0223080 A1 | 8/2017 | Velayudhan et al. | |
| 2017/0256304 A1* | 9/2017 | Poornachandran | G06F 21/50 |
| 2017/0264643 A1 | 9/2017 | Bhuiyan et al. | |
| 2017/0286320 A1 | 10/2017 | Chhabra et al. | |
| 2017/0286721 A1 | 10/2017 | Xing | |
| 2017/0331815 A1 | 11/2017 | Pawar et al. | |
| 2017/0338954 A1* | 11/2017 | Yang | H04W 12/35 |
| 2017/0346848 A1* | 11/2017 | Smith | H04W 4/00 |
| 2017/0353319 A1 | 12/2017 | Scarlata et al. | |
| 2017/0364908 A1* | 12/2017 | Smith | G06Q 20/023 |
| 2017/0366359 A1* | 12/2017 | Scarlata | H04L 9/14 |
| 2018/0059917 A1 | 3/2018 | Takehara | |
| 2018/0069708 A1 | 3/2018 | Thakore | |
| 2018/0089468 A1* | 3/2018 | Rozas | G06F 9/30145 |
| 2018/0097809 A1* | 4/2018 | Chakrabarti | H04L 67/10 |
| 2018/0113811 A1 | 4/2018 | Xing | |
| 2018/0114012 A1* | 4/2018 | Sood | G06F 21/79 |
| 2018/0114013 A1 | 4/2018 | Sood et al. | |
| 2018/0145968 A1 | 5/2018 | Rykowski et al. | |
| 2018/0183578 A1* | 6/2018 | Chakrabarti | H04L 9/0861 |
| 2018/0183580 A1* | 6/2018 | Scarlata | G06F 21/53 |
| 2018/0183586 A1* | 6/2018 | Bhargav-Spantzel | |
| | | | G06F 21/32 |
| 2018/0191695 A1* | 7/2018 | Lindemann | H04L 63/0853 |
| 2018/0210742 A1 | 7/2018 | Costa | |
| 2018/0211018 A1 | 7/2018 | Yang | |
| 2018/0212971 A1 | 7/2018 | Costa | |
| 2018/0212996 A1* | 7/2018 | Nedeltchev | H04L 67/12 |
| 2018/0213401 A1* | 7/2018 | Yang | G06Q 20/326 |
| 2018/0232517 A1* | 8/2018 | Roth | G06F 21/53 |
| 2018/0234255 A1* | 8/2018 | Fu | H04L 9/30 |
| 2018/0278588 A1 | 9/2018 | Cela et al. | |
| 2018/0285560 A1* | 10/2018 | Negi | G06F 21/72 |
| 2018/0295115 A1 | 10/2018 | Kumar et al. | |
| 2018/0300556 A1 | 10/2018 | Varerkar et al. | |
| 2018/0337920 A1 | 11/2018 | Stites et al. | |
| 2018/0349649 A1* | 12/2018 | Martel | G06F 21/71 |
| 2018/0351941 A1* | 12/2018 | Chhabra | H04L 9/38 |
| 2019/0026234 A1* | 1/2019 | Harnik | H04L 63/0428 |
| 2019/0028460 A1 | 1/2019 | Bhargava et al. | |
| 2019/0034617 A1 | 1/2019 | Scarlata et al. | |
| 2019/0044724 A1 | 2/2019 | Sood et al. | |
| 2019/0044729 A1* | 2/2019 | Chhabra | H04L 9/14 |
| 2019/0050551 A1 | 2/2019 | Goldman-Kirst et al. | |
| 2019/0058577 A1 | 2/2019 | Bowman et al. | |
| 2019/0058696 A1* | 2/2019 | Bowman | H04L 9/0822 |
| 2019/0103074 A1 | 4/2019 | Chhabra et al. | |
| 2019/0109877 A1 | 4/2019 | Samuel et al. | |
| 2019/0147188 A1* | 5/2019 | Benaloh | G06F 21/602 |
| | | | 726/26 |
| 2019/0149531 A1 | 5/2019 | Kakumani et al. | |
| 2019/0158474 A1 | 5/2019 | Kashyap et al. | |
| 2019/0163898 A1 | 5/2019 | Clebsch et al. | |
| 2019/0197231 A1 | 6/2019 | Meier | |
| 2019/0245882 A1* | 8/2019 | Kesavan | G06N 3/006 |
| 2019/0253256 A1* | 8/2019 | Saab | G06Q 20/02 |
| 2019/0258811 A1 | 8/2019 | Ferraiolo et al. | |
| 2019/0310862 A1 | 10/2019 | Mortensen et al. | |
| 2020/0233953 A1 | 7/2020 | Palsson et al. | |
| 2020/0387470 A1 | 12/2020 | Cui et al. | |

FOREIGN PATENT DOCUMENTS

| | | | | |
|---|---|---|---|---|
| CN | 101764742 A | 6/2010 | | |
| CN | 103166969 A | 6/2013 | | |
| CN | 103460738 A | 12/2013 | | |
| CN | 103826161 A | 5/2014 | | |
| CN | 106997438 A | 8/2017 | | |
| CN | 107111715 A | 8/2017 | | |
| CN | 107787495 A | 3/2018 | | |
| CN | 107851162 A | 3/2018 | | |
| EP | 1757067 A1 | 2/2007 | | |
| WO | WO-0143344 A1 * | 6/2001 | | G06F 21/6218 |
| WO | 2009029286 A2 | 3/2009 | | |
| WO | 2012082410 A2 | 6/2012 | | |
| WO | 2014062618 A1 | 4/2014 | | |
| WO | 2014158431 A1 | 10/2014 | | |
| WO | 2014196966 A1 | 12/2014 | | |
| WO | 2015066028 A1 | 5/2015 | | |
| WO | 2015094261 A1 | 6/2015 | | |
| WO | 2016209526 A1 | 12/2016 | | |
| WO | 2018027059 A1 | 2/2018 | | |

OTHER PUBLICATIONS

"Proceedings of USENIX ATC '17 2017 USENIX Annual Technical Conference", USENIX, USENIX, The Advanced Computing Systems Association, Jul. 12, 2017 (Jul. 12, 2017), pp. 1-811, XP061023212, [retrieved on Jul. 12, 2017].

First Examination Report for Indian Patent Application No. 202047046012 dated Sep. 17, 2021. 7 pages.

First Examination Report for Indian Patent Application No. 202047046246 dated Dec. 6, 2021. 5 pages.

First Examination Report for Indian Patent Application No. 202047046281 dated Dec. 7, 2021. 6 pages.

Google Cloud Platform, retrieved from https://cloudplatform.googleblog.com/2017/08/Titan-in-depth-security-in-plaintext.html (2017).

International Preliminary Report on Patentability for International Application No. PCT/US2018/042625 dated Nov. 12, 2020. 12 pages.

International Preliminary Report on Patentability for International Application No. PCT/US2018/042684 dated Nov. 12, 2020. 12 pages.

International Preliminary Report on Patentability for International Application No. PCT/US2018/042695 dated Nov. 12, 2020. 9 pages.

International Search Report and Written Opinion for PCT Application No. PCT/US2018/042625, dated Nov. 30, 2018. 19 pages.

International Search Report and Written Opinion for PCT Application No. PCT/US2018/042684, dated Dec. 5, 2018. 19 pages.

International Search Report and Written Opinion for PCT Application No. PCT/US2018/042695, dated Oct. 4, 2018. 16 pages.

(56) References Cited

OTHER PUBLICATIONS

Invitation to Pay Additional Fees, Communication Relating to the Results of the Partial International Search, and Provisional Opinion Accompanying the Partial Search Result for PCT Application No. PCT/US2018/042625, dated Oct. 8, 2018. 14 pages.

Invitation to Pay Additional Fees, Communication Relating to the Results of the Partial International Search, and Provisional Opinion Accompanying the Partial Search Result for PCT Application No. PCT/US2018/042684, dated Oct. 10, 2018. 14 pages.

Jouppi, N., et al., "In-Datacenter Performance Analysis of a Tensor Processing Unit", 44th International Symposium on Computer Architecture (ISCA), (2017) 17 pgs.

M. M. Ozdal, "Emerging Accelerator Platforms for Data Centers," in IEEE Design & Test, vol. 35, No. 1, pp. 47-54, Feb. 2018 (Year: 2018).

McKeen, Frank, et al., "Intel® Software Guard Extensions (Intel® SGX) Support for Dynamic Memory Management Inside an Enclave", Intel Corporation (2016) 9 pgs.

Office Action for European Patent Application No. 18750026.9 dated May 9, 2022. 6 pages.

Office Action for European Patent Application No. 18753285.8 dated Jul. 5, 2022. 8 pages.

The Next Platform, retrieved from https://www.nextplatform.com/2017/04/05/first-depth-look-googles-tpu-architecture/ (2017).

Office Action for Chinese Patent Application No. 201880092471.6 dated Aug. 31, 2023. 10 pages.

Office Action for Chinese Patent Application No. 201880092577.6 dated Sep. 11, 2023. 8 pages.

Office Action for Chinese Patent Application No. 201880092591.6 dated Nov. 17, 2023. 7 pages.

\* cited by examiner

```
enum IdentityClass {
  UNKNOWN = 0,
  CODE_IDENTITY = 1,
  CERTIFICATE_IDENTITY = 2,
}
```

FIGURE 3

```
message IdentityDescription {
  optional IdentityClass identity_class = 1;
  optional string authority = 2;
}
```

FIGURE 4

```
message Identity {
  optional IdentityDescription description = 1;
  optional bytes identity = 2;
}
```

FIGURE 5

```
message AssertionDescription {
  optional IdentityClass identity_class = 1;
  optional string authority = 2;
}
```

FIGURE 6

```
message Assertion {
  optional AssertionDescription description = 1;
  optional string authority = 2;
}
```

FIGURE 7

```
message SealedSecretHeader {
  // Name of the secret. This is an arbitrary, user-defined string. The
  // SecretSealer does not associate any meaning with this value.
  //
  // Users of the SecretSealer interface are expected to populate this field.
  optional string secret_name = 1;

// Version of the secret. This is an arbitrary user-defined string. The
  // SecretSealer does not associate any meaning with this value.
  //
  // Users of the SecretSealer interface are expected to populate this field.
  optional string secret_version = 2;

// Purpose of the secret. This is an arbitrary, user-defined string. The
  // SecretSealer does not associate any meaning with this value.
  //
  // Users of the SecretSealer interface are expected to populate this field.
  optional string secret_purpose = 3;

// Information about the sealing root.
  //
  // SecretSealer::SetDefaultHeader() must populate this field.
  optional SealingRootInformation root_info = 4;

// An optional list of identities belonging to the author of the sealed
  // secret.
  //
  // The SecretSealer::Seal() and SecretSealer::Reseal() methods must populate
  // this field.
  repeated EnclaveIdentity author = 5;

// ACL consisting of the enclave-identity expectations that are allowed to
  // access this secret.
  //
  // SecretSealer::SetDefaultHeader() must populate this field.
  optional IdentityAclPredicate client_acl = 6;

// Policy that the client is expected to enforce on the unwrapped secret.
  // |secret_handling_policy| is an opaque field, and its interpretation is
  // // specific to the client and/or secret.
  //
  // User of the SecretSealer interface is expected to populate this field.
  optional bytes secret_handling_policy = 7;
}
```

FIGURE 10

```
message SealedSecret {
  // Initialization vector used by the AEAD scheme used for encrypting the
  // secret. The size of the IV depends on the ciphersuite used for the
  // encryption (which may be included in the
  // SealingRootInformation::additional_info field).
  optional bytes iv = 1;

// Serialized SealedSecretHeader. The header is included in its serialized
  // form to enable deterministic MAC computation.
  optional bytes sealed_secret_header = 2;

// Data whose integrity and authenticity are verifiable.
  optional bytes additional_authenticated_data = 3;

// Ciphertext as computed by an appropriate AEAD scheme.
  optional bytes secret_ciphertext = 4;

// Bookkeeping information for the sealing root. This information is
  // strictly optional, and has no meaning for the client.
  optional bytes sealing_root_bookkeeping_info = 5;
}
```

FIGURE 11

ENCLAVE INTERACTIONS

CROSS-REFERENCE TO RELATED APPLICATION

The present application is a continuation of U.S. patent application Ser. No. 17/046,547, filed Oct. 9, 2020, which is a national phase entry under 35 U.S.C. § 371 of International Application No. PCT/US2018/042684, filed Jul. 18, 2018, which claims the benefit of the filing date of U.S. Provisional Application No. 62/664,463, filed Apr. 30, 2018, the disclosures of which are hereby incorporated herein by reference.

BACKGROUND

Enclave technologies may enable software programmers to develop secure applications that are contained inside secure execution environments called enclaves. Enclaves can be identified by a code identity. An enclave's code identity encapsulates an enclave writer's expectation of the enclave's behavior, and typically comprises cryptographic information about the code that is running inside the enclave, the environment in which the code is run, and any additional parameters that affect code execution. Enclave code identity is fundamental to many of the secure operations performed by an enclave.

An application that runs inside an enclave typically has safeguards like memory and code integrity, and memory encryption. These safeguards protect the enclave from code that executes outside of it, like the operating system or hypervisor. Additionally, enclaves can provide verifiable attestations of the code that they are running. This is a key security property that enables trust within an enclave system. With these protections and security assurances, a programmer can write an application that first verifies that it is indeed running the expected code, performs some security-sensitive computations, and provisions or extracts any additional application secrets into/out of the enclave. A single-enclave system like this is sufficient for a simple application in which the application logic is self-contained and does not require communication with outside entities. However, this same security does not translate well into more complex systems that involve multiple enclave entities, both local and remote.

Some systems also provide for secret sealing which allows for a secret to be encrypted such that only an entity with specific identity can open it. The aforementioned enclave technologies may provide hardware support for provisioning keys that are bound to a specified subset of an enclave's identity. This may grant enclaves the ability to seal secrets such that they can only be unsealed by another enclave executing on the same machine whose identity matches the subset specified by the sealer machine.

SUMMARY

Aspects of the disclosure provide a method of authentication for an enclave entity with a second entity. The method includes receiving, by one or more processors of a host computing device of the enclave entity, a request and an assertion of identity for the second entity, the assertion including identity information for the second identity; using, by the one or more processors, an assertion verifier of the enclave entity to determine whether the assertion is valid; when the assertion is valid, extracting, by the one or more processors, the identity information; authenticating the second entity using, by the one or more processors, an access control list for the enclave entity to determine whether the identity information meets expectations of the access control list; and when the identity information meets the expectations of the access control list, completing, by the one or more processors, the request.

In one example, the second entity is a non-enclave entity. In another example, second entity is a second enclave entity. In another example, the assertion is not valid, denying the request. In another example, when the identity information does not meet the expectations of the access control list, denying the request. In another example, the method also includes using an assertion generator of the enclave entity to generate a second assertion including identity information for the enclave entity and sending the second assertion to the second entity for verification. In another example, the assertion verifier includes instructions for verifying assertions and extracting identities out of verified assertions. In another example, the assertion verifier provides a Boolean response that indicates whether the assertion is valid. In another example, the method also includes using an identity access control list evaluator to determine whether the identity information meets expectations of the access control list, and the identity access control list evaluator includes instructions for operating on a set of identities possessed by an entity and evaluating that set of identities against an access-control policy. In this example, the identity access control list evaluator provides a Boolean response that indicates whether the identity information meets the expectations of the access control list match. In addition, the access control list includes expressions of enclave identity expectations, and the identity expectations are used to determine whether the identity information meets expectations of the access control list. In addition or alternatively, the enclave identity expectations are configured as predicates that include two or more identity expectations via one or more logical operations. In addition or alternatively, each identity expectation includes a reference identity and a match specification, and wherein at least one reference identity and at least one match specification are used to determine whether the identity information meets expectations of the access control list.

In another example, the enclave entity includes an enclave server including instructions configured to receive and complete the request and wherein the enclave server is used to complete the request. In another example, the identity information includes an identity description that classifies the identity of the assertion an identity type supported by the enclave entity and identifies an authority responsible for handling identities of that identity type. In this example, the authority is used to identity the assertion verifier in order to determine whether the assertion is valid. In addition or alternatively, the authority is used to identify a library in order to determine whether the identity information meets the expectations of the access control list. In addition or alternatively, the authority is used to identify a plugin including interfaces that in order to determine whether the assertion is valid and in order to determine whether the identity information meets the expectations of the access control list. In another example, the enclave entity and the second entity are located in local memory of the host computing device. In another example, the second entity is located in local memory of a second host computing device, the second host computing device being different from the host computing device.

Another aspect of the disclosure provides a method of establishing a communication channel between an enclave entity and a second entity. The method includes receiving, by one or more processors of a host computing device of the enclave entity, a request to initiate the communication channel from the second entity; negotiating, by the one or more processors, with the second entity a record protocol for the communication channel and a secret key for cryptographically protecting traffic sent over the communication channel; and after the negotiating is completed, communicating with the second entity using the communication channel using the record protocol and using the secret key to encrypt and authenticate data exchanged over the communication channel.

In one example, the method also includes conducting, by the one or more processors, an attestation and authentication process to verify an identity of the second entity, the attestation process including receiving an assertion of the second entity's identity and verifying the second entity's identity. In this example, the attestation and authentication process further includes sending an assertion of the enclave entity's identity to the second entity. In another example, negotiating the record protocol occurs before conducting the attestation and authentication process. In this example, the method further includes negotiating one or more types of assertions of identity before conducting the attestation and authentication process such that the one or more types of assertions of identity are used in the attestation and authentication process. In this example, negotiating one or more types of assertions of identity includes identifying one or more types of assertions that the enclave entity is capable of making and verifying. In addition or alternatively, negotiating one or more types of assertions of identity includes receiving one or more types of assertions that the second entity is capable of making and verifying.

In another example, the request is received as a remote procedure call to the enclave entity. In another example, the record protocol is a message passing protocol that is used to send application-level data when communicating with the second entity using the communication channel. In another example, the method also includes conducting, by the one or more processors, an authentication and authorization process to verify an identity of the second entity, and at least part of the authentication and authentication process is conducted after the negotiating is complete. In this example, a first part of the authentication and authorization process includes verifying a received assertion of the second entity's identity. In another example, a second part of the authentication and authorization process includes authorizing the second entity using identity information extracted from the assertion. In this example, the first part is performed before the communicating using the communication channel and the second part is performed before the communicating using the communication channel. Alternatively, the method also includes aborting the communication channel when the enclave entity is unable to authenticate the second entity. In another example, the record protocol is negotiated before the secret key is negotiated. In another example, the second entity is a non-enclave entity. In another example, the second entity is a second enclave entity. In this example, the negotiating is conducted with an enclave server of the second enclave entity configured to an enclave server including instructions configured to receive and complete the request and wherein the enclave server is used to complete the request. In another example, the enclave entity and the second entity are located in local memory of the host computing device. In another example, In another example, the second entity is located in local memory of a second host computing device, the second host computing device being different from the host computing device.

Another aspect of the disclosure provides a method of sealing secrets in a first enclave entity of a host computing device. The method includes inputting, by one or more processors of the host computing device, to a sealing library of the first enclave entity a header and a secret, the header including an identity access control list for the secret; generating, by the one or more processors, using the sealing library, a key; sending, by the one or more processors, the key and the identity access control list to a second enclave entity; in response to the sending, receiving, by the one or more processors, from the second enclave entity a sealed version of the key; using, by the one or more processors, the sealing library to seal the secret; and appending the sealed version of the key and the identity access control list to the sealed secret.

In one example, the sealing library includes instructions for unsealing data by accepting sealed data and output the unsealed data. In another example, the method also includes establishing communications with the second enclave entity via a remote procedure call. In this example, the method also includes using the sealing library to identify a location of the second enclave entity in order to establish the communications. In another example, the received sealing key is independent of a host computing device of the second enclave entity. In another example, the method also includes using the identity access control list to authenticate the second enclave entity before sending the key. In another example, the first enclave entity does not have access to an unencrypted version of a master secret key used to generate the sealed version of the key such that the first enclave entity is unable to unseal the sealed version of the key. In another example, the method also includes sending the sealed secret and appended sealed version of the key to a third enclave entity. In this example, the secret is only able to be sent to the third enclave entity after the secret has been sealed. In another example, the identity access control list identifies one or more entities that are able to unseal the sealed secret. In another example, sealing the secret includes sealing the secret to a whitelist that allows any enclave entity whose identity fulfills at least one identity expectation in the identity access control list to unseal the sealed secret. In another example, sealing the secret includes sealing the secret to a whitelist that allows any enclave entity whose identity fulfills all identity expectations in the identity access control list to unseal the sealed secret.

In another example, the method also includes inputting to the sealing library of the first enclave entity a second sealed secret including an appended sealed version of a second key; sending, by the one or more processors, a request to unseal the second sealed secret to a third enclave entity; receiving, by the one or more processors, an unsealed version of the second key; and using, by the one or more processors, the sealing library to unseal the second secret. In this example, the third enclave entity is one of a plurality of identical enclave instances all running identical code and each in possession of a shared master secret such that the first enclave entity is able to send the request to any of the plurality of identical enclave instances. In addition, if the third enclave entity is not available, sending the request to a fourth enclave entity. Also, the unsealed version of the second key is received from the fourth enclave entity, and the fourth enclave entity is one of the plurality of identical enclave instances. In addition or alternatively, the request is sent after a remote procedure call communication channel is established between the first enclave entity and the second enclave entity using an identity access control list for the second sealed secret. In addition or alternatively, the method also includes using the sealing library to identify a location of the third enclave entity in order to send the request to the third enclave entity. In another example, the second enclave entity is a remote sealing root, such that the second enclave entity is a different enclave from the first enclave entity. In another example, the first enclave entity and the second enclave entity are located in local memory of the host computing device. In another example, the second enclave entity is located in local memory of a second host computing device, the second host computing device being different from the host computing device.

BRIEF DESCRIPTION OF THE DRAWINGS

FIGS. 3-7 are example representations of code in accordance with aspects of the disclosure.

FIG. 10 is an example configuration of a header in accordance with aspects of the disclosure.

FIG. 11 is an example configuration of a sealed secret in accordance with aspects of the disclosure.

DETAILED DESCRIPTION

Overview

Figure 1:
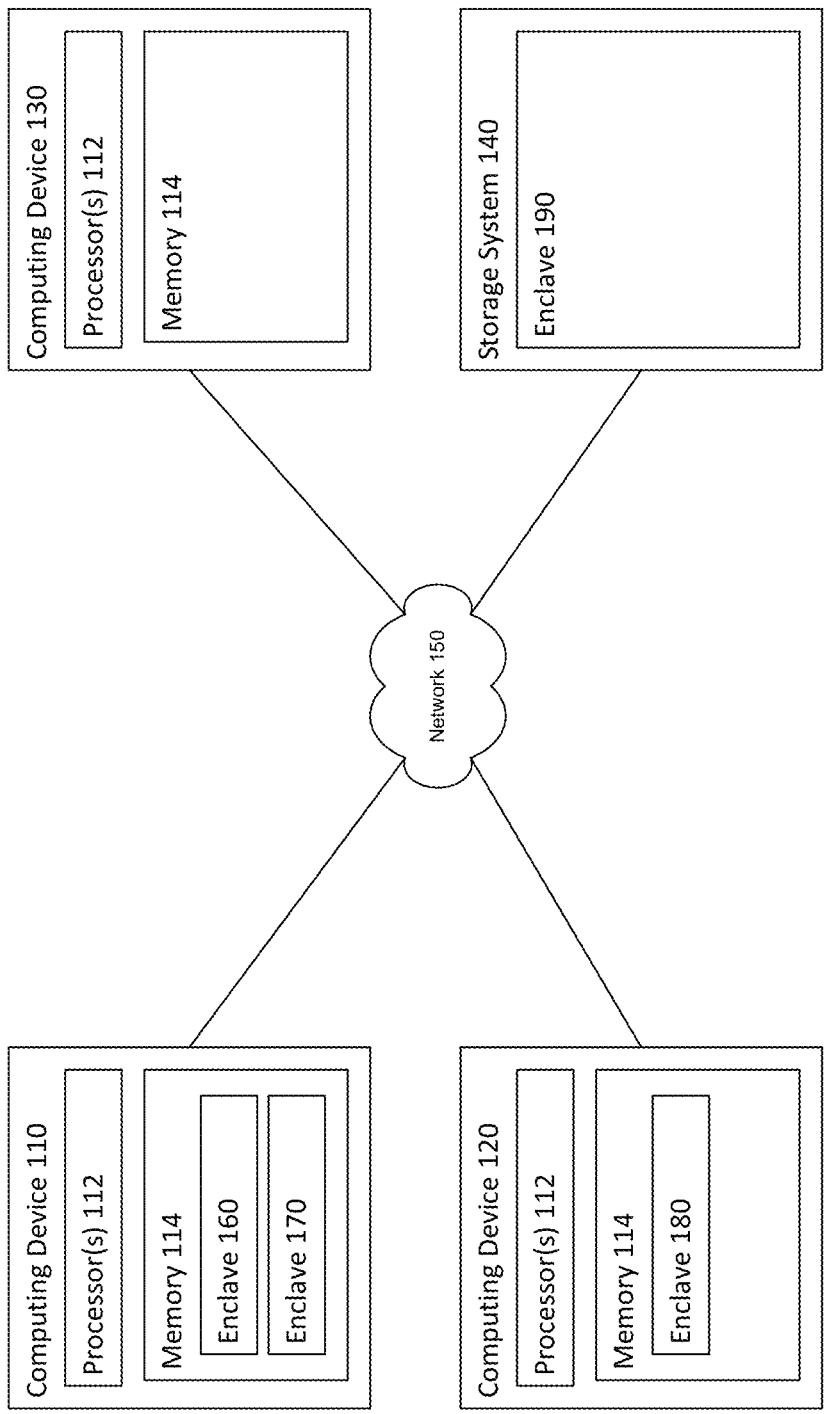
FIG. 1 is a functional diagram of an example system in accordance with aspects of the disclosure.

Aspects of the disclosure relate to identification and authentication of enclaves even where such enclave entities are backed by, or were developed using, different enclave technologies and exist on different machines. The identification and authentication features described herein may involve a plurality of different concepts, including attestation (where an enclave or non-enclave entity makes a claim about its identity), authentication (where one enclave can verify or confirm the properties of another enclave's or entity's identity), and authorization (where an enclave is provided access to information and/or operations based on that enclave's identity) as discussed in further detail below. As used herein, an identity may represent some unique characteristics of an entity. These characteristics may be used by other entities to draw inferences about the expected behavior of that entity. In a system involving multiple enclaves, an enclave can authenticate with an enclave peer by presenting an attestation of its code identity to that enclave. Attestation may be essential for establishing secure communication between two entities and also may enable higher-level systems to support authorization and access control.

A typical enclave should only have 1 type of code identity for attestation and authentication because the enclave is backed by 1 type of enclave technology. However, in more complex scenarios when a system includes multiple enclaves back by different types of technologies, there is a need to support other forms of attestation and, additionally, other types of identities. For instance, enclaves can possess other types of identities other than code identity such as certificates or tokens as well as other features unrelated to the code identity. Additionally, if an enclave system includes both non-enclave as well as enclave entities, the system may need to support identities other than code identities such as other cryptographic credentials, like tokens or certificates. In some instances, an enclave system may also include entities which may not possess any cryptographic credentials at all, and as such, the system may need to support the concept of an unauthenticated entity. As some attestation mechanisms are CPU-specific and can only be used meaningfully within a particular machine or computing device, there is also a need to provide alternative mechanisms of attesting code identity such that an attestation is meaningful to remote entities, or even non-enclave entities.

To enable the operations needed for implementing attestation, authentication, and authorization in an identity framework that supports many different types of identities, three roles or programming interfaces, including a generator, a verifier and an evaluator may be employed at each enclave in an enclave system. An Assertion Generator may include instructions for generating assertions on behalf of entities in the enclave system. In this regard, each Assertion Generator may provide an operation that generates an assertion that makes a claim of an identity. Assertions generated by these operations may be cryptographically-verifiable.

An Assertion Verifier may include instructions for verifying assertions, and extracting identities out of verified assertions. The Assertion Verifier may provide an operation that verifies an assertion of a specific type of identity. In that regard, an enclave may include different Assertion Verifiers for different types of entities.

An identity access control list (ACL) may include data defined by a user or programmer of the application that created the enclave in order to evaluate arbitrary logical expressions of enclave identity expectations. The identify ACLs provides a way for a user to specify exactly what properties are relevant for any given situation, relationship, or enclave. Each enclave may also include one or more Identity ACL Evaluators that include instructions for operating on a set of identities possessed by an entity and evaluating that set of identities against an access-control policy.

Each of the enclaves may also include an enclave client and an enclave server. The enclave clients may include instructions for generating remote procedure calls (RPCs) to other enclaves or entities within the enclave system. Similarly, the enclave server may include instructions for receiving and responding to requests generated by or from other enclaves or entities within the enclave system.

The identity framework may define common representations for identities, assertions, and identity expectations. For instance, the identity framework may include classes of identity or categories of identity supported by the identity framework as well as an authority designation which identifies or defines the entity responsible for handling a particular type of identity or assertion.

Different types of identities in the identity framework may share a common representation. For instance, each identity may have an Identity Description, which classifies the identity into one of the identity classes supported by the identity framework and also identifies the authority responsible for handling identities of that type. These common representations may be used when defining common operations on identities, assertions, and identity expectations. The operations for each of the aforementioned programing interfaces in the identity framework may also be defined in terms of these common representations rather than specific forms or instances of these constructs. By defining operations in terms of these common representations, it is possible to unite different identities, assertions, and identity expectations into a single, unified framework.

The identity framework described may be extensible in order to support various notions of enclave identity. Extensions to the framework may be provided in the form of plugins. A plugin may be a library that implements each of the three programming interfaces for a particular identity and assertion type. An application that leverages the identity framework may also make use of many plugins simultaneously. This may provide for a rich development environment that supports many types of enclave identity.

Communication within a system of multiple enclaves also poses a more challenging problem than a single-enclave application. A single-enclave application may only require exchanging information between the enclave and a local, untrusted caller. This problem is typically addressed by providing programmers with a simple message-passing mechanism as well as attestation primitives that can be used to develop a secure enclave application. In a multi-enclave system, it may be the case that the enclaves that need to communicate are on different machines and/or are backed by different enclave technologies. They must rely on untrusted communication mechanisms, such as UDP or TCP sockets to send and receive messages. To provide for additional security when establishing a communication channel, these enclaves may utilize a remote procedure call (RPC) security framework which provides for additional messages to enable the enclaves to perform mutual authentication/attestation, as well as agree on an encryption key that could be used to encrypt their communications.

One possible way of securing enclave communication is to modify the application-level protocol between the enclaves to incorporate enclave attestation in an ad-hoc way. For example, consider a protocol that enables Enclave A to retrieve a secret from Enclave B. The two enclaves could achieve this using a sequence of messages like the following:

Enclave A→Enclave B
Message 1: identifies the secret and requests a challenge
Enclave B→Enclave A
Message 2: contains a challenge
Enclave A→Enclave B
Message 3: provides a public key, and an attestation of
  Enclave A's identity that is bound to the challenge and the public key
Enclave B→Enclave A
Message 4: contains the actual secret encrypted with the public key However, secure-protocol development is challenging to program, dangerously error-prone, and rests the majority of the security burden on the programmer. While there are some protocols available, these are limited in that they are specific to the technology on which an enclave is backed. For instance, Intel's Enhanced Privacy ID (EPID) protocol, which provides an authentication mechanism as well as key-exchange, only supports attestation for SGX enclaves. There are various other cryptographic handshake protocols that can be used to establish secure and authenticated channels, such as Transport Layer Security (TLS) or Application Layer Transport Security (ALTS). However, none of these protocols support authentication based on enclave code identity or more than one form of identity.

To address these limitations, the identity framework can be used to implement an RPC security system based on enclave identity by providing a handshake protocol that performs enclave-identity-based authentication during establishment of a communication channel. The handshake protocol may make use of various implementations of the Assertion Generator and Assertion Verifier to enable the exchange of assertions between two entities, thereby allowing the entities to mutually-authenticate. By using the identity framework described above, the handshake protocol may be able to enable a unified authentication mechanism that supports arbitrary types of enclave identities.

The RPC security system may be used wherein an RPC channel is secured based on enclave identities and RPCs are routed over that channel. In this regard, calls into or out of an enclave can be modelled as RPCs. This RPC security system can also be applied to calls between pair of enclaves or between enclaves and non-enclave entities that possess some cryptographic credentials.

To initiate the RPC channel, a handshake protocol may be performed during channel establishment. The handshake protocol may be used to achieve specific security guarantees on the subsequent established channel and may provide channel confidentiality, authentication using one or more enclave identities, and support for a higher level authorization system. The handshake protocol may be used during establishment of an RPC communication channel and may take place before the enclave client and enclave server exchange any application-level data. During the handshake protocol, the entities exchange and verify assertions, negotiate a record protocol, and negotiate a secret key that is used to cryptographically protect future traffic sent over the channel. After the handshake protocol completes, the enclave client and enclave server communicate using the record protocol and all data exchanged is encrypted with the secret key.

The programming interface that supports the RPC security system may be implemented as a library discussed above. The library may define the exact format and interpretation of the bytes of an assertion. Because of the use of a library, the format of the assertion, the assertion offer, and the assertion request need not be strictly specified by the handshake protocol, and the handshake protocol may operate on opaque blobs of bytes that represent assertions, assertion requests, and assertion offers. A simplified example of a possible protocol is described below.

The handshake protocol allows for various identities to be asserted during the exchange. The desired assertions could be configured on both the client and the server. These libraries could be registered with handshake through static registration, and all registered libraries could be added to the registration map and can be queried to check for the existence of a particular library. Using this registration map, the enclave client and enclave server (or an RPC server of a non-enclave entity) can generate and verify assertions depending on their configuration and on which libraries are available.

The handshake protocol supports authentication for various types of enclave identities and allows participants to exchange multiple identities during the authentication process. As with the identity framework, the RPC security system can be adapted to new identities by adding new Assertion Generators and Assertion Verifiers for those identities. After the handshake protocol has been completed, both the enclave client and enclave server (or an RPC server of a non-enclave entity) may access authentication properties of the connection in order to access the identity information of the other to proceed to authenticate one another.

As noted above, some systems also grant enclaves the ability to seal secrets such that they can only be unsealed by another enclave executing on the same machine whose identity matches the subset specified by the sealer. However, these features cannot be used to seal secrets to an enclave whose identity does not match the sealer's identity nor can such features be used to seal secrets to enclaves executing on a different machine or computing device.

Thus, another possible application of the identity framework may include a secret sealing framework. The secret sealing framework may enable cryptographic-sealing of sensitive secrets within a multi-enclave system and disclosure of such secrets only to authorized entities in the system independent of the specific host machines or computing devices on which the entities reside.

The secret sealing frame work may involve a SecretSealer interface. A SecretSealer may accept a header, a secret, and additional authenticated data and output a sealed secret. This additional authenticated data may be encrypted during transit via the RPC communication channels described herein, but may be otherwise unencrypted. A SecretSealer may also include instructions for unsealing secrets by accepting a sealed secret and output a secret. The header may include metadata about the secret, as well as an identity ACL of enclave identities that are allowed to unseal the secret. This header may also be included in the sealed secret outputted by a SecretSealer and may be verified by a SecretSealer in order to output the secret.

The entity that actually implements the sealing and unsealing may be a sealing root and can either be a local or a remote entity. A local sealing root may be a root that executes in the same enclave as the SecretSealer. A remote sealing root may be a root that executes in a different enclave than the SecretSealer. The remote sealing root may function via the RPC communications channels and handshake protocols discussed herein. As such, a remote sealing root can make use of the Assertion Generator and Assertion Verifier interfaces to perform authentication with enclave clients that make requests to seal or unseal secrets. This also allows the remote root to cryptographically verify the identity of the enclave client, allowing the remote root to unseal secrets only when the requestor's identity matches the identity ACL present in the header of a sealed secret. In addition, an enclave client may leverage assertions by the remote sealing root and refuse to communicate with the remote root if its identity does not match the client's identity expectation(s).

The remote sealing root may include of a plurality of identical enclave instances all running identical code and each in possession of a shared master secret. This master secret is used to derive keys that seal individual secrets and may only be available in an unencrypted form within the remote sealing root enclave instances.

The identity ACL for a sealed secret may include of a set of enclave identity expectations as with the identity ACLs discussed above. Because the identity expectations that make up an ACL are grouped using an arbitrary nesting of logical operators, this may provide a SecretSealer with some flexibility when sealing a secret.

The features described here provide for complex multi-enclave systems that unite various notions of enclave identity and attestation into a single, technology-agnostic framework. These systems are especially useful for users that are looking to enclave technology for additional security for their applications or that want to alleviate concerns about running security-sensitive workflows in the cloud. The identity framework is also extensible and composable via plugins. For instance, the identity framework described herein can be expanded arbitrarily to add support for new kinds of identities. This extensibility is enabled via the framework's plugin model. As such, users can select which extensions to use in their applications, thereby enabling support for only the identities needed in their particular application.

In addition, the RPC security system features may allow for multi-enclave systems that are as secure as individual enclave applications. These features may be especially useful in situations in which an enclave does not know the location of the other entity (i.e. the recipient of the RPC) and scales very well to larger enclave systems making the RPC Security system especially useful for cloud-based computing. This is because the channel is secured so that only the entities involved in establishing the channel can read and write to the channel, the entities involved in establishing the channel exchange and verify each other's enclave identities, and both entities can set up authorization policies to control which calls can be made over the channel by authenticated entities. This RPC security system can be utilized in a multi-enclave system to enable secure and authenticated communication channels between two enclaves or enclaves and non-enclave entities in that system and also provide call-level authorization.

The secret sealing framework discussed herein also provides for sealing of secrets that is independent of the identity of the sealer and the hardware on which the secret is sealed. As such, the secret sealing framework may enable cryptographic-sealing of sensitive secrets within a multi-enclave system and disclosure of such secrets only to authorized entities in the system independent of the specific host machines or computing devices on which the entities reside.

Example Systems

FIG. 1 includes an example enclave system 100 in which the features described herein may be implemented. It should not be considered as limiting the scope of the disclosure or usefulness of the features described herein. In this example, enclave system 100 can include computing devices 110, 120, 130 and storage system 140 connected via a network 150. Each computing device 110, 120, 130 can contain one or more processors 112, memory 114 and other components typically present in general purpose computing devices.

Although only a few computing devices and a storage systems are depicted in the system 100, the system may be expanded to any number of additional devices. In addition to a system including a plurality of computing devices and storage systems connected via a network, the features described herein may be equally applicable to other types of devices such as individual chips, including those incorporating System on Chip (Soc) or other chips with memory, that may include one or more enclaves.

Memory 114 of each of computing devices 110, 120, 130 can store information accessible by the one or more processors 112, including instructions that can be executed by the one or more processors. The memory can also include data that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data may be retrieved, stored or modified by the one or more processors 112 in accordance with the instructions. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Each of the computing devices 110, 120, 130 can be at different nodes of a network 150 and capable of directly and indirectly communicating with other nodes of network 150. Although only a few computing devices are depicted in FIG. 1, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Like the memory discussed above, the storage system 140 may also store information that can be accessed by the computing devices 110, 120, 130. However, in this case, the storage system 140 may store information that can be accessed over the network 150. As with the memory, the storage system can include any non-transitory type capable of storing information accessible by the processor, such as a hard-drive, memory card, ROM, RAM, DVD, CD-ROM, write-capable, and read-only memories.

In this example, the instructions of each of computing devices 110, 120, 130 may include one or more applications. These applications may define enclaves 160, 170, 180, 190 within memory, either locally at memory 114 or remotely at the storage system 140. Each enclave may be "hosted" by the hardware on which the enclave is stored. For instance, computing device 110 may be a host computing device for enclaves 160 and 170, and computing device 120 may be a host computing device of enclave 180. Each enclave can be used to store data and instructions while at the same time limit the use of such data and instructions by other applications. For instance the data may include sensitive information such as passwords, credit card data, social security numbers, or any other information that a user would want to keep confidential. And, as discussed further below, the instructions may be used to limit the access to such data. Although computing device 110 includes only two enclaves, computing device 120 includes only 1 enclave, computing device 130 includes no enclaves, and storage system 140 includes only 1 enclave, any number of enclaves may be defined with the memory of the computing devices 110, 120, storage system 140, or any other devices of system 100.

Each of these enclaves may be considered an "entity" of the enclave system 100. Similarly, applications of computing device 130 or the computing device 130 or other devices or application, such fixed function security ASICs, smart cards, as well as remote services hosted in the cloud, may also be considered "non-enclave" entities.

As an entity, the enclaves may have or be used to generate identities and assertions that may enable attestation and authentication in an identity framework of the enclave system 100. An assertion may be a cryptographically-verifiable claim of an identity. However, to enable authorization, an identity expectation, which includes a base reference identity, and a match specification that specifies a subset of the reference identity that is relevant to the expectation may be used. In this regard, an identify expectation may represent an expectation of an identity or rather how an entity within the enclave system would state an expectation of what another entity's identity should be.

To enable the operations needed for implementing attestation, authentication, and authorization in the identity framework, three roles or programming interfaces, including a generator, a verifier and an evaluator may be employed at each enclave in the enclave system 100. For instance, turning to FIG. 2, enclaves 160, 170, 180, 190 each include one or more Assertion Generators 210, 212, 214, 216. Each enclave may include different types of Assertion Generators for different types of assertions as each type of identity may have many different types of assertions. An Assertion Generator may include instructions for generating assertions on behalf of entities in the enclave system. In this regard, each Assertion Generator may provide an operation that generates an assertion that makes a claim of an identity. Assertions generated by these operations may be cryptographically-verifiable.

In addition, a verifier can verify the assertion to determine whether the claim of an assertion is valid. For instance, each enclave 160, 170, 180, 190 includes one or more Assertion Verifier(s) 220, 222, 224, 226. The Assertion Verifier may include instructions for verifying assertions, and extracting identities out of verified assertions. The Assertion Verifier may provide an operation that verifies an assertion of a specific type of identity. In that regard, an enclave may include different Assertion Verifiers for different types of identities. In operation, given an assertion, an Assertion Verifier may determine whether or not the claim of an identity in an assertion is valid. As an example, the Assertion Verifier may return a Boolean response (i.e. a yes/no answer) that indicates whether the assertion can be verified. If the assertion is valid and is verified, the Assertion Verifier may also extract the identity from the assertion.

Each enclave 160, 170, 180, 190 may also include an identity access control list (ACL) 230, 232, 234, 236. Each of these identity ACLs may include data defined by a user or programmer of the application that created the enclave in order to evaluate arbitrary logical expressions of enclave identity expectations. An enclave identity expectation consists of a reference identity and a match specification. As such, the identity ACLs provides a way for a user to specify exactly what properties are relevant for any given situation, relationship, or enclave. For instance, an enclave identity I would be considered to fulfill identity expectation E if the match specification subset of E's reference identity is identical to the match specification subset of I.

Each enclave 160, 170, 180, 190 may also include one or more Identity ACL Evaluators 240, 242, 244, 246. These Identity ACL Evaluators may include instructions for operating on a set of identities possessed by an entity and evaluating that set of identities against an access-control policy. The access-control policy may be specified as a predicate over one or more identity expectations. At an implementation level, such predicates can be specified as one or more identity expectations combined together via arbitrary logical operations like AND, OR, and NOT.

The Identity ACL Evaluators may also provide an operation that matches an identity against an identity ACL predicate or baseline identity expectation. In other words, given an identity and an identity ACL predicate identity expectation, this Identity ACL Evaluator checks whether the identity matches the expectation. For instance, if the two are incompatible, the Identity ACL Evaluator may return "false". If the two are compatible but do not match, the Identity ACL Evaluator may also return "false". Otherwise, if the match checks out, the Identity ACL Evaluator may return "true".

One or more of the Identity ACL Evaluators in the enclave system 100 can be implemented utilizing one or more sub-operations. For instance, an identity expectation matcher may provide an operation that matches an identity against an identity expectation. This operation may apply the match specification to the reference identity and then perform the match. This may provide a Boolean result (i.e. a yes/no answer). This operation can be used to implement evaluation of complex logical predicates. The Identity ACL Evaluator can thus implement predicate evaluation in terms of this identity expectation matcher. As an example, consider an ACL L that chains together identity expectations A, B, and C in the following predicate: ((A OR B) AND C). The Identity ACL Evaluator evaluates a list of identities N against this ACL by delegating each individual matching operation (e.g. Match N against A, Match N against B, Match N against C) to the identity expectation matcher. The same identity expectation matcher may handle all these matching operations, or each match can be handled by a different identity expectation matcher. An identity expectation matcher may also delegate some matching operations to other matchers and summarize the results.

Each of the enclaves may also include an enclave client 250, 252, 254, 256 and an enclave server 260, 262, 264, 266. The enclave clients may include instructions for generating remote procedure calls (RPCs) to other enclaves or entities within the enclave system 100. Similarly, the enclave server may include instructions for receiving and responding to requests generated by or from other enclaves or entities within the enclave system.

The identity framework may define common representations for identities, assertions, and identity expectations. For instance, the identity framework may include classes of identity or categories of identity supported by the identity framework as well as an authority designation, for example defined in an Identity or Authority Description for an identity or an assertion as shown in FIGS. 4 and 6, which identifies or defines the entity responsible for handling a particular type of identity or assertion. As an example, the identity framework may support two (or many more) classes of identity: code identity and certificate-based identity. As such, a code identity may include an "ABC" code identity and a "123" code identity, where ABC code identity is handled by the ABC authority and 123 code identity is handled by the 123 authority. An entity that possesses either the ABC code identity or the 123 code identity can have its identity represented in the identity framework. Similarly, an assertion may include an "XYZ" type assertion and a "456" type assertion, where XYZ type assertion is handled by the XYZ authority and 456 type assertion is handled by the 456 authority. Of course, ABC, 123, XYZ, and 456 are merely abstract examples; any number of additional identities and authorities with different designations may also be used. FIG. 3 provides an example defining of supported classes of identities with a protocol buffer enumerator.

Identities in the identity framework may share a common representation. For instance, each identity may have an Identity Description, which classifies the identity into one of the identity types or classes supported by the identity framework and also identifies the authority responsible for handling identities of that type, appended to an actual identity. The Identity Description allows different types of identities to be represented in a consistent fashion. For example, the Identity Description with an authority value could be represented with a protocol-buffer message as shown in FIG. 4.

The actual identity may be an opaque blob of bytes that utilizes any underlying encoding or data representation. By examining an identity's Identity Description, the identity class for the identity may be determined and the blob may be decoded to extract other details of the identity. An identity can, for example, be represented by a protocol-buffer message as shown in FIG. 5.

Assertions in the identity framework may have a similar representation to identities. Like an identity, an assertion may have an Assertion Description. An Assertion Description may classify the identity that is asserted in the assertion into one of the identity classes supported by the identity framework and may also identify the authority that handles assertions of that type. FIG. 6 provides an example defining of Assertion Description with an authority value with a protocol buffer enumerator.

An assertion includes a type of identity, an authority, and a blob of bytes containing the actual cryptographically-verifiable claim of identity. In this regard, the blob is the actual assertion of an identity. The type of identity and authority indicate how to interpret the blob so that the blob can be passed on to the correct Assertion Verifier for verification. An assertion can, for example, be represented with the protocol-buffer message as shown in FIG. 7.

These common representations may be used when defining common operations on identities, assertions, and identity expectations. The operations for each of the aforementioned programing interfaces in the identity framework may also be defined in terms of these common representations rather than specific forms or instances of these constructs. By defining operations in terms of these common representations, it is possible to unite different identities, assertions, and identity expectations into a single, unified framework.

The identity framework described may be extensible in order to support various notions of enclave identity. Extensions to the framework may be provided in the form of plugins. A plugin may be a library that implements each of the three programming interfaces for a particular identity and assertion type. In this regard, different libraries may be used for different types of assertions or for different types of identities, although if two types of assertions are very similar, they may be handled by the same library. Alternatively, a single library may be able to handle more than one type of assertion. The libraries may be plugged into the identity framework so that it can be used in conjunction with the entire identity framework. An application that leverages the identity framework may also make use of many plugins simultaneously. This may provide for a rich development environment that supports many types of enclave identity.

This identity framework may be implemented using any programming language that supports some notion of abstract classes (interfaces). For illustrative purposes, the examples herein relate to an identity framework implemented in a C++ ecosystem, where Protocol Buffers are used as the data representation format for identities, assertions, and identity expectations, though other languages and data representation formats may also be employed. Each of the programming interfaces described above, can be defined within as a Java class or a C++ class where each operation exists as a virtual class method. A component library may also be used to provide a concrete implementation of each programming interface. For instance, a component library can be utilized directly, such as to generate a specific assertion or to perform an identity match, or may be used in the context of a higher-level system that makes use of the abstract identity and assertion features described above. For instance, the identity matching operations may require access to various concrete implementations on demand.

One possible approach may utilize a combination of delegation and static registration. First, a concrete implementation of the interface may be used to handle all possible identity types. This class may be referred to as a delegator. Within a given program exactly one instance of this class may be instantiated such that the class is a singleton. Every other concrete implementation may also be instantiated once and then inserted into an execution-unit-wide registration map. In this regard, an instance of the registration map may exist inside of the Enclave, and another instance of the registration map may exist outside of the Enclave. These instances may be identical or with minor differences, for instance, given the different locations. This registration map could be populated via static registration of the available component libraries. In order to perform an identity match, the delegator's matching operation may be called with the inputs. The delegator may query the registration map with the Identity Description to find the appropriate concrete implementation of an identity matcher for that identity. If such an implementation exists, the delegator may delegate the call to the matching operation on the respective object. If an implementation does not exist, the delegator may return an error that indicates that the identity type is not supported.

Figure 8A:
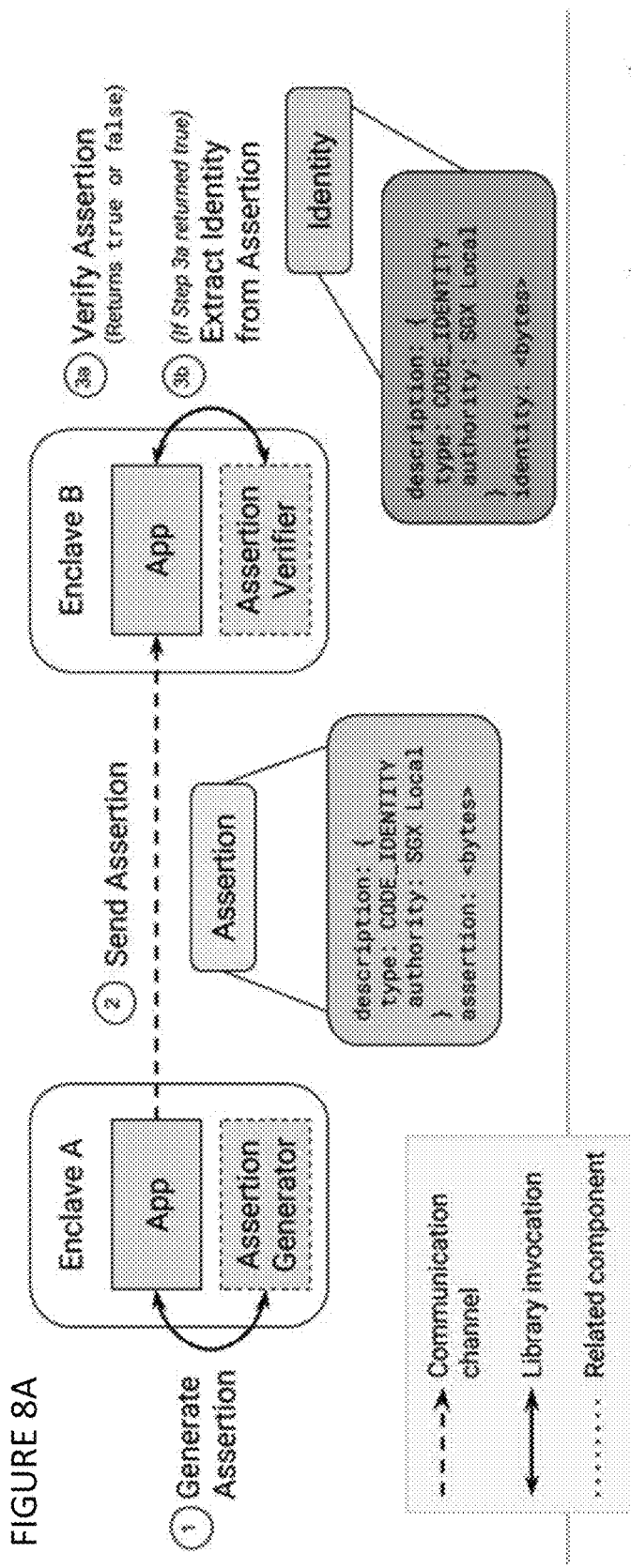
FIGS. 8A-8B are an example flow of an attestation, authentication and authorization concepts in accordance with aspects of the disclosure.
Figure 8B:
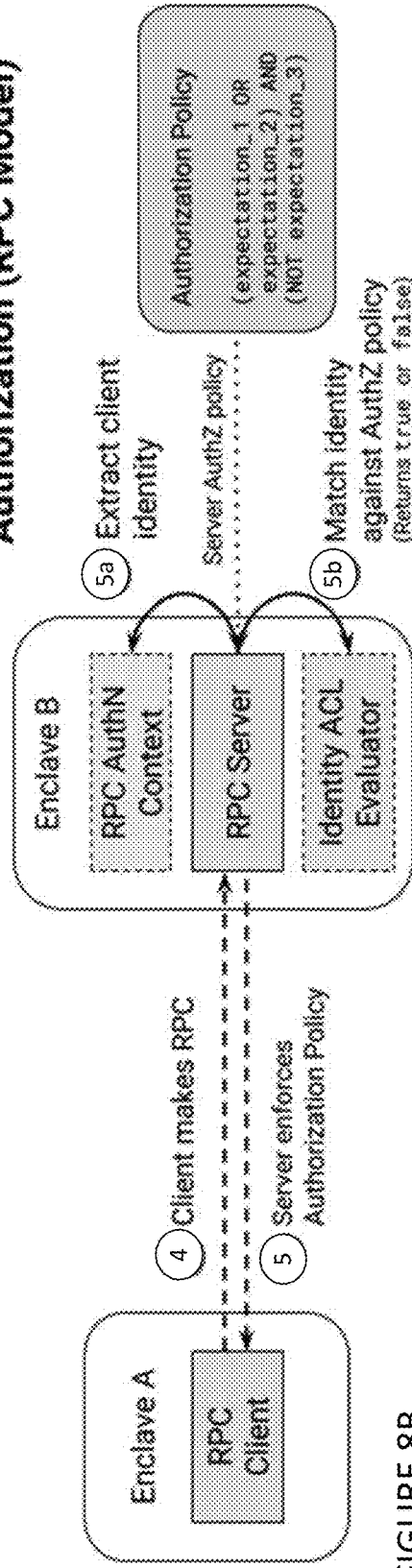

FIGS. 8A and 8B provide a visual representation of the attestation, authentication and authorization concepts in operation within the identity framework described above. Enclave A and Enclave B may represent two different enclaves running on the same (such as enclaves 160 and 170) or different computing devices (such as enclaves 160 and 180) backed by the same or different enclave technologies and operating within the enclave system. In this regard, the actual processing of such information may be performed by the processors 112 of the computing devices on which the enclaves reside or which otherwise operate on the enclaves (for instance, remotely).

Turning to FIG. 8A, at step (1), an application (via the one or more processors 112) at the computing device of Enclave A uses Enclave A's Assertion Generator to generate an assertion of Enclave A's identity. At step (2), the assertion is sent by Enclave A via a communication channel, for instance locally or over network 150, to the Enclave B. At step (3a), an application (via the one or more processors 112) at the computing device of Enclave B utilizes Enclave B's Assertion Verifier to verify the received assertion. If Enclave B's Assertion Verifier returns "false" the authentication process ends as the assertion from Enclave A is not valid. If Enclave B's Assertion Verifier returns "true," at step (3b), the Assertion Verifier extracts the identity from the assertion.

Turning to FIG. 8B, at step 4, after authentication, an enclave client (RPC client in FIG. 8B) of Enclave A may be used to initiate an RPC to Enclave B via a communication channel, for instance locally or over network 150. At step 5a, an RPC server of Enclave B may be used to extract the client identity (via the one or more processors 112) and at step 5b may use Enclave B's Identity ACL Evaluator to determine whether the identity matches the authorization policy or the ACL for the RPC server. If Enclave B's Identity ACL Evaluator returns "false" the RPC is denied as the extracted identity is not valid or rather does not meet the expectations defined in the ACL. If Enclave B's Identity ACL Evaluator verifier returns "true," at step (6), then the extracted identity does meet the expectations defined in the ACL. As such, the RPC server of Enclave B may complete the RPC that was requested by the enclave client of Enclave A.

The identity framework described above may be used in various ways. For instance, the identity framework can be used to implement an RPC security system based on enclave identity by providing a handshake protocol that performs enclave-identity-based authentication during establishment of a communication channel. The handshake protocol may make use of various implementations of the Assertion Generator and Assertion Verifier to enable the exchange of assertions between two entities, thereby allowing the entities to mutually-authenticate. By using the identity framework described above, the handshake protocol may be able to enable a unified authentication mechanism that supports arbitrary types of enclave identities.

The RPC security system may be used wherein an RPC channel is secured based on enclave identities and RPCs are routed over that channel. In this regard, calls into or out of an enclave can be modelled as RPCs. For instance, an untrusted entity could make an RPC into an enclave that offers an API to untrusted callers. Similarly, in the reverse situation, the enclave could make an outgoing RPC to the host or local computing device in order to request some sort of system resource or to write a log message. The RPC security system can also be applied to calls between enclave entities. An enclave that wants to make a call into another enclave can issue an RPC to an enclave server running in that enclave. Additionally, this RPC security system can also be applied to calls between enclaves and non-enclave entities that possess some cryptographic credentials.

As noted above, to initiate the RPC channel, a handshake protocol may be performed during channel establishment. The handshake protocol may be used to achieve specific security guarantees on the subsequent established channel and may provide channel confidentiality, authentication using one or more enclave identities, and support for a higher level authorization system.

Figure 9:
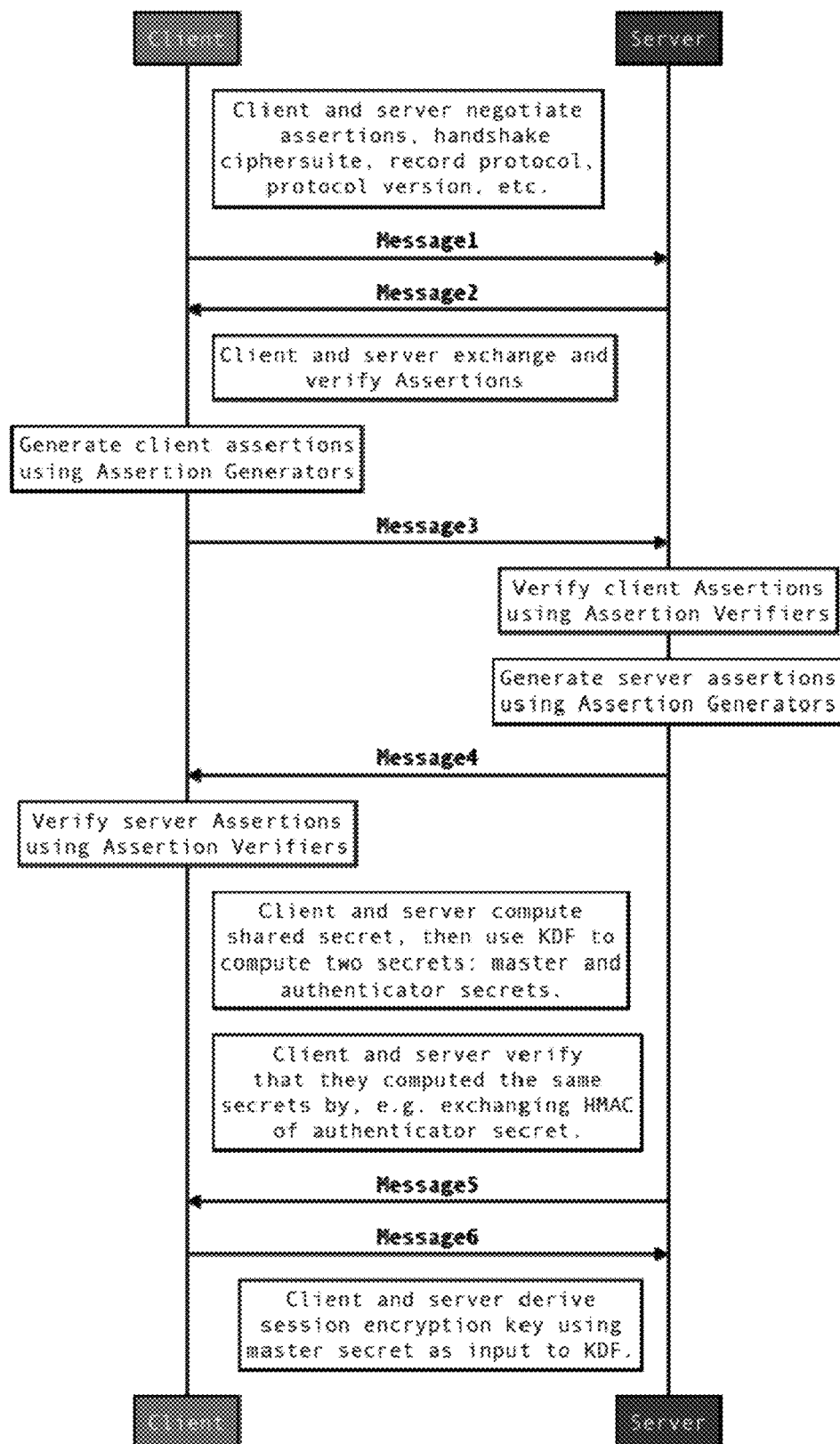
FIG. 9 is an example flow of a handshake protocol in accordance with aspects of the disclosure.

FIG. 9 is an example flow of messages between a "client" and a "server" according to the aforementioned handshake protocol. The entity which initiates the connection is the client. The client establishes a channel with the server. Either the client or the server may be an enclave entity, and it may be the case that both are enclave entities. In this regard, the client may represent an enclave client of a first enclave or entity, such as enclave 160 or a non-enclave entity such as an application of client computing device 110, 120, or 130, and the server may represent an enclave server of a second enclave or entity, such as enclaves 170, 180 or a non-enclave entity such as an application of client computing device 110, 120, or 130.

The handshake protocol may be used during establishment of an RPC communication channel and may take place before the client and server exchange any application-level data. During the handshake protocol, the entities exchange and verify assertions, as discussed above with regard to FIG. 8A, negotiate a record protocol, and negotiate a secret key that is used to cryptographically protect future traffic sent over the channel. After the handshake protocol completes, the client and server communicate using the record protocol and all data exchanged is encrypted and/or authenticated with the secret key.

Referring to FIG. 9, Message1, from the client to the server, and Message2, from the server to the client, may enable the participants (i.e. the server and the client) to negotiate the types of assertions, a handshake cipher suite, a record protocol and handshake protocol version. By allowing the participants to negotiate which types of assertions will be used, the handshake protocol is able to support authentication that meets the security expectations of both participants. This negotiation (Message1 and Message2) can take place at the beginning of the handshake before any identities are asserted. Thus, the participant that initiates the exchange adopts the "client" role by sending a message (Message1) containing its assertion requests and assertion offers to the second participant. The second participant adopts the role of the "server". The server receives the client's offers and requests, selects between them according to which identities the server is capable of asserting and verifying, and then sends back the server's own offers and requests (Message2).

The programming interface that supports the RPC security system may be implemented as a library discussed above. The library may define the exact format and interpretation of the bytes of an assertion. Because of the use of a library, the format of the assertion, the assertion offer, and the assertion request need not be strictly specified by the handshake protocol, and the handshake protocol may operate on opaque blobs of bytes that represent assertions, assertion requests, and assertion offers. The handshake protocol leaves the majority of the work to the libraries, but calls those interfaces in at specific times during the handshake protocol. A simplified example of a possible protocol is described below.

The handshake protocol allows for various identities to be asserted during the exchange. The desired assertions could be configured on both the client and the server. Each participant would use the appropriate library to either generate (using an Assertion Generator) and verify (using an Assertion Verifier) an assertion on demand. Again, as described above these libraries could be registered with a handshaker library through static registration, and all registered libraries could be added to the aforementioned registration map and can be queried to check for the existence of a particular library. The handshaker library may be used to conduct the handshake protocol. In this regard, each of the client and server will have its own handshaker library. Using this registration map, the enclave client and enclave server (or an RPC server of a non-enclave entity) can generate and verify assertions depending on their configuration and on which libraries are available.

Returning to FIG. 9, the record protocol may be a message-passing protocol that is used to send application-level data. For the enclave system 100, this may be used as the base protocol over which RPCs and all RPC metadata are sent. As an example, the RPC security system could employ gRPC, which uses HTTP for message framing, and the record protocol could use AES-GCM with 128-bit keys and an even-odd scheme for dividing the counter space. The HTTP frames would then be secured using this protocol once the handshake completed.

Message3 and Message4 allow for authentication between the client and the server. For instance, the server may generate, using the server's Assertion Generator, an assertion of the server's identity. The server may then send this assertion to the client (Message3). Thereafter, the client would verify the assertion using the client's Assertion Verifier. Similarly, the client may generate, using the client's Assertion Generator, an assertion of the client's identity. The client may then send this assertion to the server (Message4). Thereafter, the server would verify the assertion using the server's Assertion Verifier. In this regard, Message3 and Message4 may correspond to step 2 of FIG. 2A. If the assertions are not verified or the Assertion Verifiers of the client and/or server return false, as in step 3A of FIG. 8A, the client and/or server may abort the handshake.

The handshake protocol supports authentication for various types of enclave identities and allows participants to exchange multiple identities during the authentication process. As with the identity framework, the RPC security system can be adapted to new identities by adding new Assertion Generators and Assertion Verifiers for those identities. Thus, these identities can be arbitrarily extended as discussed in the ABC, 123, XYZ and 456 examples discussed above. In other words, the handshake protocol is independent of and need not be changed if new identities are added to the identity framework. This is because the handshake protocol does not need to understand the details of a specific identity or even how to operate on it.

Message5 and Message6 may enable channel confidentiality by allowing the handshake participants to agree on a handshake cipher suite and to negotiate a session encryption key. Channel confidentiality allows data transmitted on the channel to remain private to the channel participants. The session encryption key is only known to the participants involved in the handshake and is used to encrypt and/or authenticate further traffic on the channel. As such, no third party can eavesdrop on and/or tamper with the communication between these entities.

As an example, negotiation of a session encryption key can be achieved through a Diffie-Hellman key exchange. In this exchange, the participants, the client and the server may generate ephemeral Diffie-Hellman key pairs. The key pair includes a private key, which is kept secret by the participant, and a public key, which can be shared with the other participants. The participants exchange their Diffie-Hellman public keys and then, using elliptic-curve cryptography, they can compute a secret value. This secret value can then be used as an input to a key-derivation function (KDF), such as HKDF, to derive a session encryption key. The KDF can also take additional context information from the handshake, such a hash of the handshake transcript, as an input into the key derivation process. This would provide the property that the derived key is cryptographically tied to the identities exchanged and verified during the handshake, as well as any random values that were exchanged earlier in the handshake to establish session uniqueness.

After the handshake protocol has been completed, both the enclave client and enclave server (or an RPC server of a non-enclave entity) may access authentication properties of the connection in order to access the identity information of the other to proceed to authorize as in step (3*b*) of FIG. 8A and steps (4)-(6*b*) in FIG. 8B. This enables the client and server to establish and enforce access-control policies. In the context of an RPC security system, this means enforcing access control policies on particular RPCs defined in the RPC security system. For instance, authorization policies on the server side may be used to enforce that the client meets certain identity requirements. The RPC security system also supports client-side authorization decisions. This is fundamental for the enclave security model because clients themselves can possess secrets and must ensure that they only send these secrets to authorized entities.

After an RPC communication channel is established using the handshake protocol, the two entities may proceed to send their RPC traffic over the established secure channel. The RPC communication channel is established if it meets the authentication requirements of both participants, but there can be additional authorization constraints layered on top of this. For instance, in the case of an enclave server communicating with remote enclave clients, the enclave server may accept RPCs generated by or from enclave clients with any 123 code identity but may have specific code-identity requirements for a set of highly-sensitive RPCs.

The authorization layer, which enables the callee to check whether the caller meets the identity expectations for a particular call, may be implemented in various ways. In one approach, the authorization mechanism may be built into the RPC system (e.g. gRPC). The enclave server and enclave client may be configured with their respective authorization policies when they are initially programmed, and the RPC security system then automatically enforces these policies. When a call is made, the authorization layer may access the underlying authentication properties of the RPC communication channel to determine whether the authorization policies are satisfied. In another approach, the authorization logic may be written into the enclave application logic, such as directly into the enclave client or enclave server. For instance, a programmer may access the underlying authentication properties of the channel and define the programmer's own authorization logic in order to allow an enclave to check whether the caller or callee meets the identity expectations for a particular call. This is especially useful where the RPC framework does not have built-in authorization and/or where a programmer needs to utilize more complex logic than what's expressible via the RPC authorization policy.

Both these approaches may require access to the underlying channel authentication properties that were extracted from the results of the handshake protocol discussed above. This can be encapsulated in an authentication context object on either of the channel. The enclave client's authentication context contains identity information about the enclave server and the enclave server's authentication context contains identity information about the enclave client. Because the authentication process is based on the aforementioned identity framework, it is possible to extract various types of enclave identities during the handshake protocol and store them in a common data representation, such as a Protocol Buffer.

The authorization policies themselves can be defined in terms of RPC names and enclave identity ACL (i.e., an arbitrary logical combination of enclave identity expectations). For instance, one example authorization policy would associate an RPC having a particular name with an enclave identity expectation. A more complex authorization policy would associate an RPC with a logical predicate that strings together various enclave identity expectations into a more complex expectation. In this regard, the authorization process may proceed utilizing an Identity ACL Evaluators as shown in FIG. 8B.

Another possible application of the identity framework may include a secret sealing framework. The secret sealing framework may enable cryptographic-sealing of sensitive secrets within a multi-enclave system and disclosure of such secrets only to authorized entities in the system independent of the specific host machines or computing devices on which the entities reside.

Figure 2:
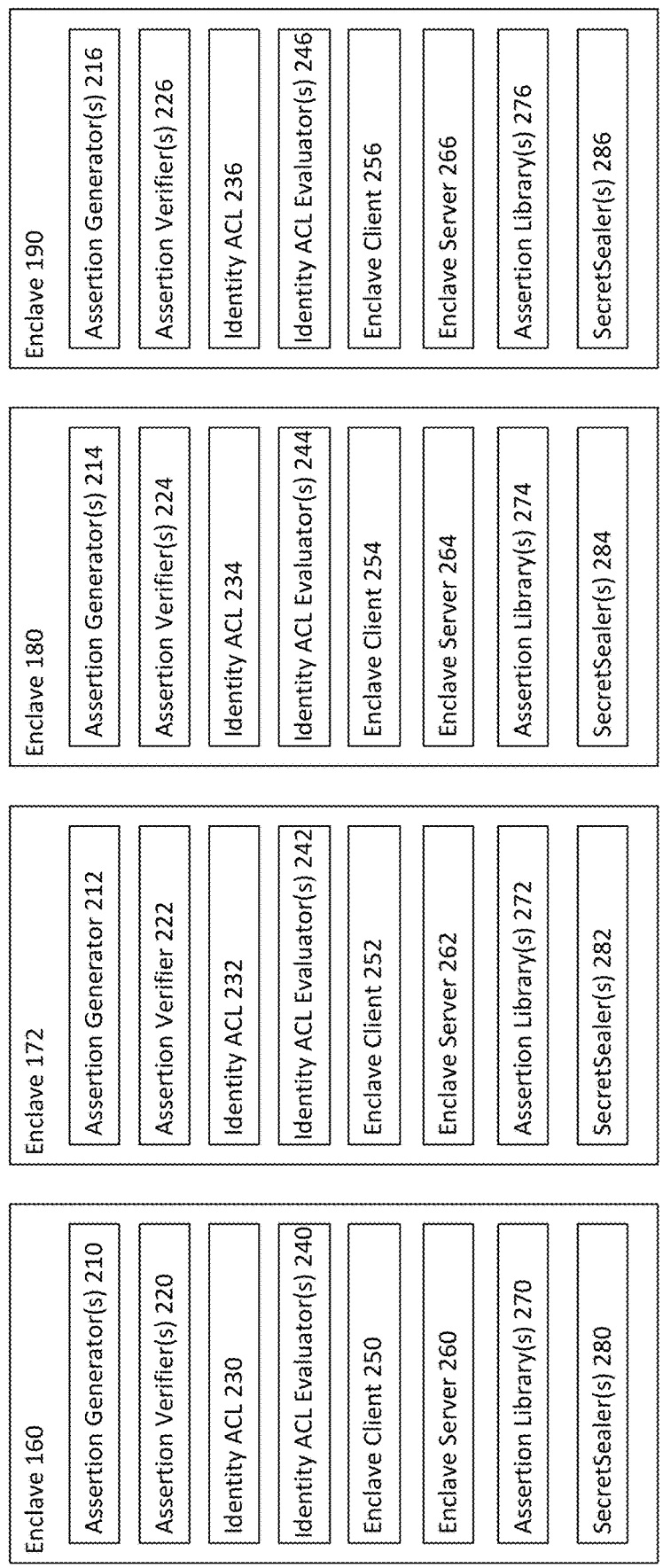
FIG. 2 is a functional diagram of aspects of the system of FIG. 1.

The secret sealing framework may involve a SecretSealer interface. For instance, as shown in FIG. 2, each of the enclaves 160, 170, 180, 190 includes one or more SecretSealer(s) 280, 282, 284, 286. Each SecretSealer may be considered a "sealer library" that includes instructions for sealing secrets. For instance, a SecretSealer may accept a header, a secret, and additional authenticated data and output a sealed secret. This additional authenticated data may be encrypted during transit via the RPC communication channels described above, but may be otherwise unencrypted. A SecretSealer may also include instructions for unsealing secrets by accepting a sealed secret and output a secret.

The header may include metadata about the secret, as well as an identity ACL of enclave identities that are allowed to unseal the secret. This header may also be included in the sealed secret outputted by a SecretSealer and may be verified by a SecretSealer in order to output the secret. FIG. 10 is representative of a configuration of a header, and FIG. 11 is representative of a configuration of a sealed secret.

The entity that actually implements the sealing and unsealing may be a sealing root and can either be a local or a remote entity. A local sealing root may be a root that executes in the same enclave as the SecretSealer. Local sealing roots may directly leverage hardware support for key-provisioning to seal secrets to the identity of the enclave of the SecretSealer. For example, in some sealing technologies local sealing roots may bind secrets to either the code identity—a measurement over the code that implements the enclave—or the signer identity—a measurement over the entity that signed the enclave. However, such local sealing roots may be limited in that they may not be able to bind secrets to enclaves with a completely different identity than the enclave of the SecretSealer or enclaves running on a different host machine or computing device.

A remote sealing root may be a root that executes in a different enclave than the SecretSealer. Remote sealing roots may also run in a stand-alone enclave and receive requests for sealing and unsealing secrets from enclave clients. Remote sealing roots may also require communication via RPCs. In this regard, the remote sealing root may function via the RPC communications channels and handshake protocol discussed above. As such, a remote sealing root can make use of the Assertion Generator and Assertion Verifier interfaces to perform authentication with enclave clients that make requests to seal or unseal secrets. This also allows the remote root to cryptographically verify the identity of the enclave client, allowing the remote root to unseal secrets only when the requestor's identity matches the identity ACL present in the header of a sealed secret. In addition, an enclave client may leverage assertions by the remote sealing root and refuse to communicate with the remote root if its identity does not match the client's identity expectation(s).

Remote sealing roots do not need to leverage hardware support for provisioning sealing keys for sealed secrets. Doing so may lead to problematic situations. For instance, if the remote sealing root is damaged or lost, all secrets sealed against it will be lost as well. To address this, the remote sealing root may include of a plurality of identical enclave instances all running identical code and each in possession of a shared master secret. In this regard, if one of the enclaves of the remote sealing root is damaged or lost, others of the plurality may "fill in" and provide keys to unseal sealed secrets that were previously sealed by the damaged enclave.

This master secret is used to derive keys that seal individual secrets. The master secret may only be available in an unencrypted form within the remote sealing root enclave instances. For the sake of availability and reliability, an implementation may persist the master secret outside the remote-root enclaves in an encrypted form, using a local-root-based SecretSealer (protected by hardware-provisioned keys).

The identity ACL for a sealed secret may include of a set of enclave identity expectations as with the identity ACLs discussed above. Because the identity expectations that make up an ACL are grouped using an arbitrary nesting of logical operators, this may provide a SecretSealer with some flexibility when sealing a secret. For example, the secret can be sealed to a whitelist, allowing any enclave whose identity fulfills at least one identity expectation in the identity ACL to unseal the secret. In addition or alternatively, the secret can be sealed such that it can only be unsealed by an enclave whose identity fulfills all identity expectations in the identity ACL for the sealed secret.

In addition to a header and encrypted data, a sealed secret also contains "additional authenticated data" and "bookkeeping info". These pieces of data are presented in a plain, unencrypted form, the authenticity of which can be established by unsealing the secret. "Additional authenticated data" may be provided by a SecretSealer and may allow unencrypted data to be cryptographically bound to the sealed secret. "Bookkeeping info" may be provided by the remote sealing root and may be treated as opaque data by a SecretSealer. This data can be used by the sealing root to store any internal, implementation-specific data related to the secret.

Figure 12:
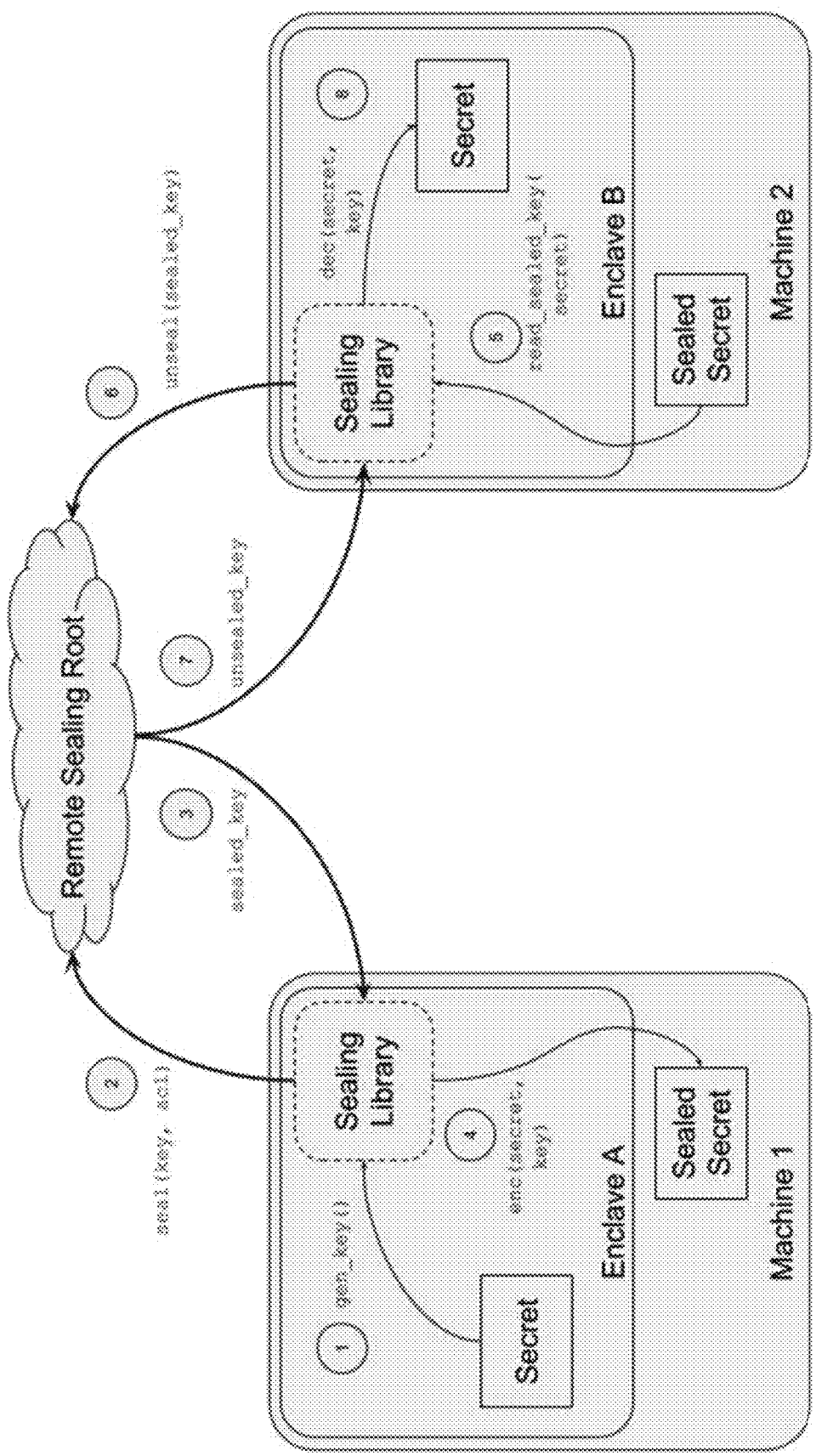
FIG. 12 is an example flow of a secret sealing framework in accordance with aspects of the disclosure.

FIG. 12 provide a visual representation of aspects of the secret sealing framework described above. Again, Enclave A and Enclave B may represent two different enclaves running on different computing devices (such as enclaves 160 and 180) backed by the same or different enclave technologies and operating within the enclave system. In this regard, the actual processing of such information may be performed by the processors 112 of the computing devices on which the enclaves reside or which otherwise operate on the enclaves.

The Remote Sealing Root of FIG. 12 executes in a different enclave than the SecretSealers of Enclaves A and B. Thus, if Enclave A is enclave 160, the remote sealing root may be in enclave 170, enclave 180, or enclave 190. As such, for the purposes of demonstration, Machine 1 may refer to computing device 110, Enclave A may refer to enclave 160, Machine 2 may refer to computing device 120, Enclave B may refer to the enclave 180, and the Remote Sealing Root may be in enclave 190, for instance, operated by computing device 130 or some other computing device. Of course, other configurations are also possible. For instance, Machine 1 and Machine 2 could correspond to the same computing device, such as computing device 120, where Enclave A is enclave 160 and Enclave B is enclave 170.

Referring to FIG. 10, at step (1), an application (via the one or more processors 112) at the computing device of Enclave A may input a request to seal a secret into Enclave A's SecretSealer (Sealing Library). This request includes a header, a secret, and additional authenticated data. As noted above, the header includes an identity ACL for the secret to be sealed. The SecretSealer generates a key (gen_key( )) and sends a request (seal(key, ac1)) at step (2) including the key generated by the SecretSealer and the identity ACL for the secret to be sealed to the Remote Sealing Root. The location and/or identity of the remote sealer root may be selected by a programmer and defined in the SecretSealer. Of course, the request may be sent after Enclave A and the enclave of the Remote Sealing Root establish an RPC communication channel using the handshake protocol described above, and the Remote Sealing Root and Enclave A are able to authenticate one another using the identity ACL for the secret to be sealed as discussed above.

Once the Remote Sealing Root receives the request, the Remote Sealing Root may use a master secret key to seal the key (sealed_key). At step (3), the sealed key is sent back to the SecretSealer of Enclave A. The SecretSealer then uses the original key to encrypt (enc(secret, key)) the secret and appends the sealed key as well as the identity ACL to the sealed secret generated at step (4). Thereafter, the sealed secret is able to leave Enclave A. For instance, the sealed secret may be sent from Machine 1 to Machine 2.

In order to unseal the secret, the sealed secret may be passed to Enclave B's SecretSealer with a request to unseal the sealed secret. In response, Enclave B's SecretSealer may then read the sealed key from the sealed secret (read_sealed_key(secret)) and send a request (unseal(sealed_key)) including the sealed key at step (7). This request may be sent after Enclave B and the enclave of the Remote Sealing Root establish an RPC communication channel using the handshake protocol described above, and the Remote Sealing Root and Enclave B are able to authenticate one another using the identity ACL appended to the sealed secret as discussed above.

Once the Remote Sealing Root receives the request, the Remote Sealing Root may use the master secret key to unseal the sealed key (unsealed_key). At step (7), the unsealed key (which is the original key generated by the SecretSealer of Enclave A) is sent back to the SecretSealer of Enclave B. The SecretSealer then uses the unsealed key to decrypt (dec(secret, key)) the sealed secret at step (8). Thereafter, the unsealed secret is able to be processed at Enclave B.

Remote sealing roots can be implemented in other ways as well. For instance, the remote root may generate both the sealed and unsealed key, and/or the client may send unencrypted data (i.e. plaintext) to the remote sealing root for encryption.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of establishing a communication channel between an enclave entity and a second entity, the method comprising:
  receiving, by one or more processors of a host computing device of the enclave entity, a request to initiate the communication channel from the second entity;
  negotiating, by the one or more processors with the second entity, one or more types of assertions of identity to be exchanged between the enclave entity and the second entity;
  negotiating, by the one or more processors with the second entity, a record protocol for the communication channel and a secret key for cryptographically protecting traffic sent over the communication channel; and
  in response to negotiating the one or more types of assertions of identity, the record protocol, and the secret key, communicating, by the one or more processors with the second entity, using the record protocol and the secret key to encrypt and authenticate data exchanged over the communication channel.

2. The method of claim 1, further comprising conducting, by the one or more processors, an attestation and authentication process to verify an identity of the second entity, wherein the attestation and authentication process comprises:
  receiving an assertion of the identity of the second entity; and
  verifying the assertion of the identity of the second entity.

3. The method of claim 2, wherein the attestation and authentication process further comprises authorizing the second entity based on identity information extracted from the assertion of the identity of the second entity.

4. The method of claim 2, further comprising aborting the communication channel when the enclave entity is unable to verify the identity of the second entity.

5. The method of claim 2, wherein the attestation and authentication process further comprises sending an assertion of an identity of the enclave entity to the second entity.

6. The method of claim 2, wherein negotiating the record protocol occurs before conducting the attestation and authentication process.

7. The method of claim 2, wherein the one or more types of assertions of identity are used in the assertion and authentication process.

8. The method of claim 1, wherein negotiating the one or more types of assertions of identity comprises identifying one or more types of assertions that the enclave entity is capable of generating and verifying.

9. The method of claim 1, wherein negotiating the one or more types of assertions of identity comprises receiving one or more types of assertions that the second entity is capable of generating and verifying.

10. The method of claim 1, wherein the record protocol is a message passing protocol for sending application-level data when communicating with the second entity over the communication channel.

11. The method of claim 1, wherein the record protocol is negotiated before the secret key is negotiated.

12. A system comprising:
  one or more processors; and
  one or more storage devices coupled to the one or more processors and storing instructions that, when executed by the one or more processors, cause the one or more processors to perform operations for establishing a communication channel between an enclave entity and a second entity, the operations comprising:
    receiving, by the enclave entity, a request to initiate the communication channel from the second entity;
    negotiating, by the one or more processors with the second entity, one or more types of assertions of identity to be exchanged between the enclave entity and the second entity;
    negotiating, by the enclave entity with the second entity, a record protocol for the communication channel and a secret key for cryptographically protecting traffic sent over the communication channel; and
    in response to negotiating the one or more types of assertions of identity, the record protocol, and the secret key, communicating, by the enclave entity with the second entity, using the record protocol and the secret key to encrypt and authenticate data exchanged over the communication channel.

13. The system of claim 12, wherein the operations further comprise conducting, by the enclave entity, an attestation and authentication process to verify an identity of the second entity, wherein the attestation and authentication process comprises:
  receiving an assertion of the identity of the second entity; and
  verifying the assertion of the identity of the second entity.

14. The system of claim 13, wherein the attestation and authentication process further comprises authorizing the second entity based on identity information extracted from the assertion of the identity of the second entity.

15. The system of claim 13, wherein the operations further comprise aborting the communication channel when the enclave entity is unable to verify the identity of the second entity.

16. The system of claim 13, wherein the one or more types of assertions of identity are used in the assertion and authentication process.

17. The system of claim 12, wherein the record protocol is a message passing protocol for sending application-level data when communicating with the second entity over the communication channel.

18. A non-transitory computer readable medium for storing instructions that, when executed by one or more processors, cause the one or more processors to perform operations for establishing a communication channel between an enclave entity and a second entity, the operations comprising:
- receiving, by the enclave entity, a request to initiate the communication channel from the second entity;
- negotiating, by the one or more processors with the second entity, one or more types of assertions of identity to be exchanged between the enclave entity and the second entity;
- negotiating, by the enclave entity with the second entity, a record protocol for the communication channel and a secret key for cryptographically protecting traffic sent over the communication channel; and
- in response to negotiating the one or more types of assertions of identity, the record protocol, and the secret key, communicating, by the enclave entity with the second entity, using the record protocol and the secret key to encrypt and authenticate data exchanged over the communication channel.

19. The non-transitory computer readable medium of claim 18, wherein the operations further comprise conducting, by the enclave entity, an attestation and authentication process to verify an identity of the second entity, wherein the attestation and authentication process comprises:
- receiving an assertion of the identity of the second entity; and
- verifying the assertion of the identity of the second entity.

20. The non-transitory computer-readable medium of claim 19, wherein the attestation and authentication process further comprises authorizing the second entity based on identity information extracted from the assertion of the identity of the second entity.

* * * * *